(12) United States Patent
Liang

(10) Patent No.: US 8,255,021 B2
(45) Date of Patent: Aug. 28, 2012

(54) ROTATING MECHANISM AND ELECTRONIC DEVICE USING SAME

(75) Inventor: Shi-Xu Liang, Shenzhen (CN)

(73) Assignees: Shenzhen Futaihong Precision Industry Co., Ltd., ShenZhen, Guangdong Province (CN); FIH (Hong Kong) Limited, Kowloon (HK)

( * ) Notice: Subject to any disclaimer, the term of this patent is extended or adjusted under 35 U.S.C. 154(b) by 0 days.

(21) Appl. No.: 13/048,944

(22) Filed: Mar. 16, 2011

(65) Prior Publication Data

US 2012/0122523 A1    May 17, 2012

(30) Foreign Application Priority Data

Nov. 16, 2010  (CN) .............................. 201010546121

(51) Int. Cl.
*H04M 1/00* (2006.01)
(52) U.S. Cl. ............ 455/575.4; 379/433.12; 379/433.13
(58) Field of Classification Search ................. 455/575.4
See application file for complete search history.

(56) References Cited

U.S. PATENT DOCUMENTS

| 7,376,450 B2* | 5/2008 | Chen ........................... 455/575.4 |
| 7,546,150 B2* | 6/2009 | Makino ....................... 455/575.1 |
| 7,818,038 B2* | 10/2010 | Huang ........................ 455/575.4 |
| 8,122,568 B2* | 2/2012 | Jin et al. ........................... 16/357 |
| 2007/0293283 A1* | 12/2007 | Inubushi et al. ........... 455/575.1 |
| 2008/0045279 A1* | 2/2008 | Ohki ........................... 455/575.1 |

* cited by examiner

*Primary Examiner* — Lester Kincaid
*Assistant Examiner* — Diego Herrera
(74) *Attorney, Agent, or Firm* — Altis Law Group, Inc.

(57) ABSTRACT

A rotating mechanism includes a lower plate defining a first guiding groove and a second guiding groove, the first guiding groove including a sliding groove section and a rotating groove section, the sliding groove section mirror-image symmetrical with the second guiding groove, the rotating groove section extending from an end of the sliding groove section toward the second guiding groove; an upper plate defines a first track and a second track; an elastic element assembly having two opposite retaining portions; a first pin located at one of the retaining portions, the first pin slidably received in the first guiding groove and the first track; and a second pin located at the other retaining portion, the second pin slidably received in the second guiding groove and the second track.

13 Claims, 6 Drawing Sheets

ROTATING MECHANISM AND ELECTRONIC DEVICE USING SAME

BACKGROUND

1. Technical Field

This disclosure relates to rotating mechanisms, particularly to rotating mechanisms used in an electronic device.

2. Description of Related Art

Many portable electronic devices, such as mobile phones, include a lower element and an upper element with a display mounted thereon. However, many of these electronic devices use complicated components and methods to enable a rotatable connection between the upper and lower elements.

Therefore, there is a room for improvement in the art.

BRIEF DESCRIPTION OF THE DRAWINGS

Many aspects of the embodiments can be better understood with reference to the following drawings. The components in the drawings are not necessarily drawn to scale, the emphasis instead being placed upon clearly illustrating the principles of the exemplary rotating mechanism for electronic device. Moreover, in the drawings like reference numerals designate corresponding parts throughout the several views. Wherever possible, the same reference numbers are used throughout the drawings to refer to the same or like elements of an embodiment.

DETAILED DESCRIPTION

Figure 1:
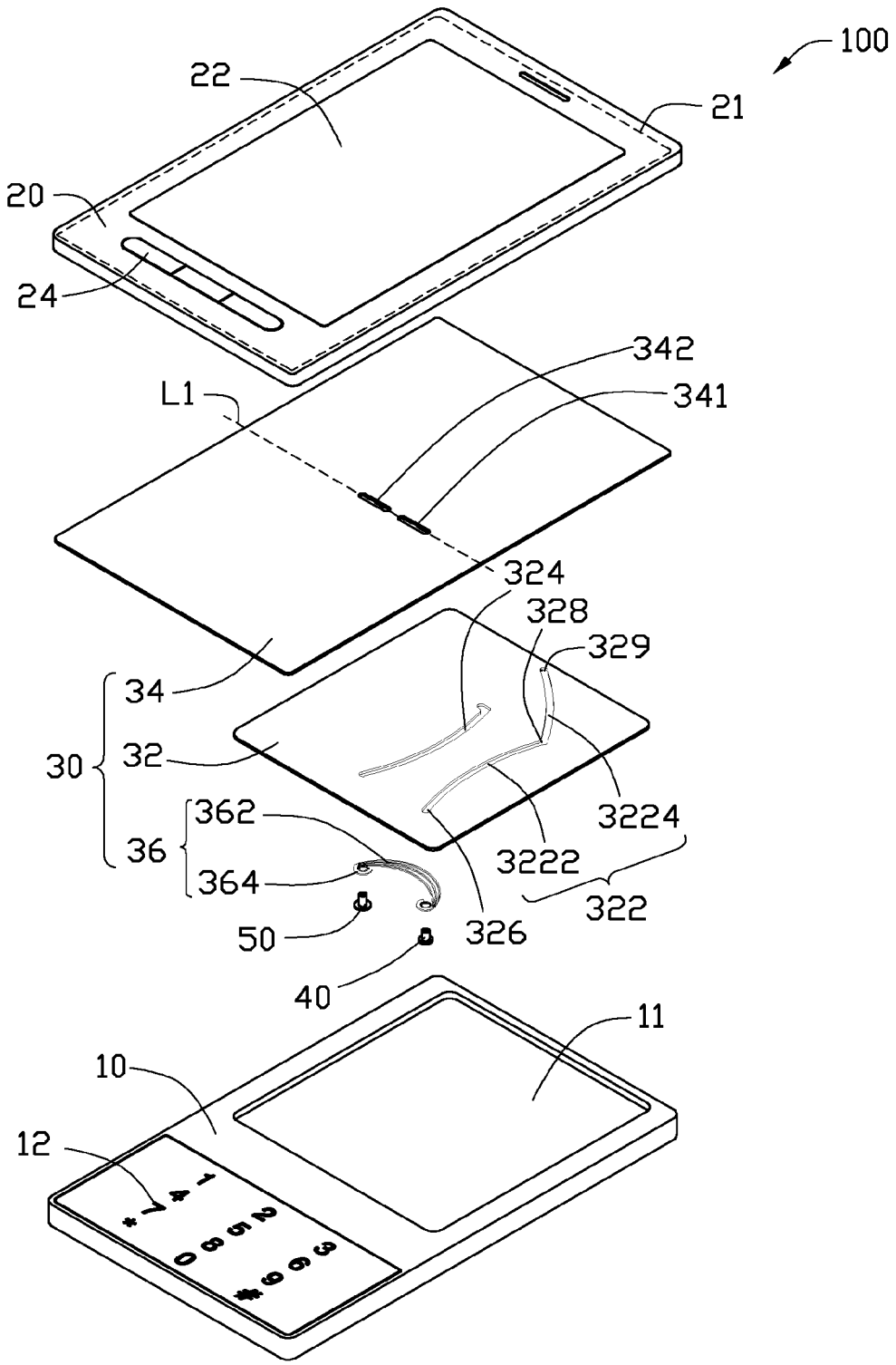
FIG. 1 is an exploded view of an electronic device with an exemplary embodiment of a rotating mechanism.
Figure 2:
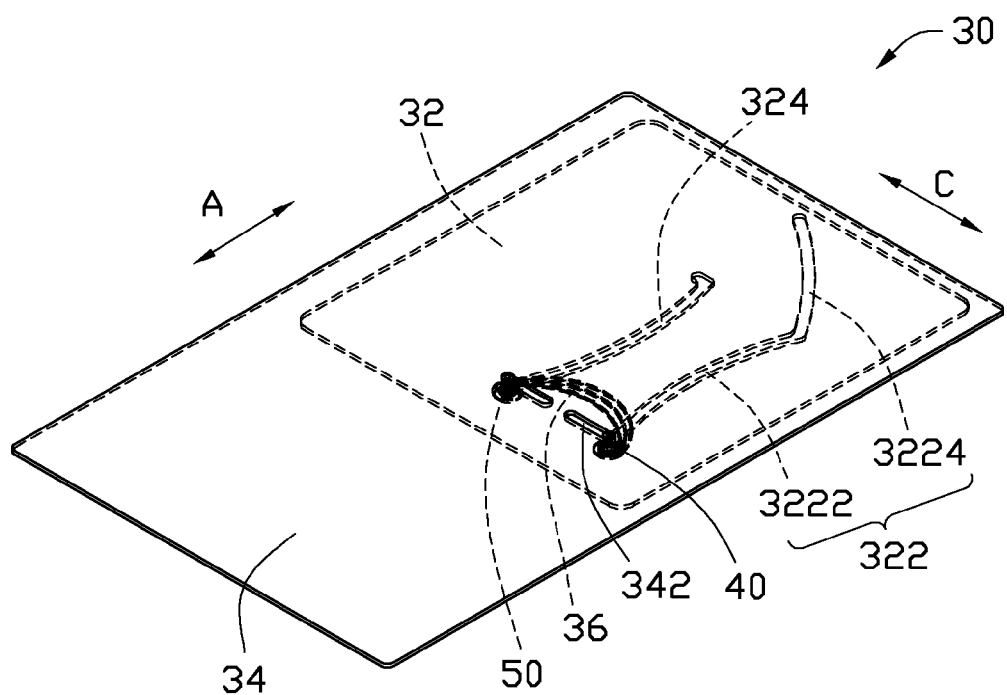
FIG. 2 is an assembled view of the rotating mechanism shown in FIG. 1.

FIG. 1 illustrates an exploded view of an electronic device 100 using an exemplary embodiment of a rotating mechanism 30. FIG. 2 illustrates an assembled view of the rotating mechanism 30 shown in FIG. 1. The electronic device 100 includes an upper housing 20 and a lower housing 10, which are connected by the rotating mechanism 30. The upper housing 20 defines a receptacle 21 facing the lower housing 10 and the lower housing 10 defines a compartment 11 facing to the receptacle 21. The receptacle 21 and the compartment 11 cooperatively accommodate the rotating mechanism 30.

The rotation mechanism 30, in this exemplary embodiment, includes a lower plate 32 and an upper plate 34 and an elastic element assembly 36. The upper plate 34 can slide relative to the lower plate 32 in a first direction A in FIG. 2, and can rotate relative to the lower plate 32 in a second direction B in FIG. 5. The lower plate 32 is mounted to the lower housing 10 and the upper plate 34 is mounted to the upper housing 20 so the upper housing 20 can rotate and slide with the upper plate 34 relative to the lower housing 10 when the upper plate 34 rotates and slides relative to the lower plate 32.

The lower plate 32 defines a first guiding groove 322 and a second guiding groove 324. The first guiding groove 322 includes a sliding groove section 3222 and a rotating groove section 3224. The second guiding groove 324 has the same shape and size as the sliding groove section 3222, both of which are mirror-image symmetrical and spaced from each other. The second guiding groove 324 and the sliding groove section 3222 both extend along the first direction A. The sliding groove section 3222 includes a first sliding end 326 and an opposite second sliding end 328. The rotating groove section 3224 is defined from the second sliding end 328 toward the second guiding groove 324, and a rotating end 329 is formed in a distal end of the rotating groove section 3224. In this exemplary embodiment, the elastic element assembly 36 includes a compressible spring. The sliding groove section 3222 and the second guiding groove 324 are both arcuate. The sliding groove section 3222 and the second guiding groove 324 can be other shapes, such as V-shaped.

The upper plate 34 defines a first track 341 and a second track 342, both of which extend in a third direction C in FIG. 2, perpendicular to the first direction A. In this exemplary embodiment, the first track 341 and the second track 342 lay on the same imaginary line L1 shown in FIG. 1.

The elastic element assembly 36 includes a resilient portion 362 and two retaining portions 364 respectively located at opposite ends of the resilient portion 362. The electronic device 100 further includes a first pin 40 and a second pin 50. The first pin 40 is retained on one of the retaining portions 364, and slidably retained in the first guiding groove 322 and the first track 341. The second pin 50 is retained on the other retaining portion 364, and slidably retained in the second guiding groove 324 and the second track 342.

Referring to FIGS. 1-4, in assembly, the first pin 40 and the second pin 50 are respectively retained on respective retaining portions 364. The first pin 40 enters into the first guiding groove 322 and the first track 341. The second pin 50 enters into the second guiding groove 324 and the second track 342. The upper plate 34 is mounted to the receptacle 21 so the upper plate 34 is retained on the upper housing 20. The lower plate 32 is mounted to the compartment 11 so the lower plate 32 is retained on the lower housing 10, to yield an assembled electronic device.

Figure 3:
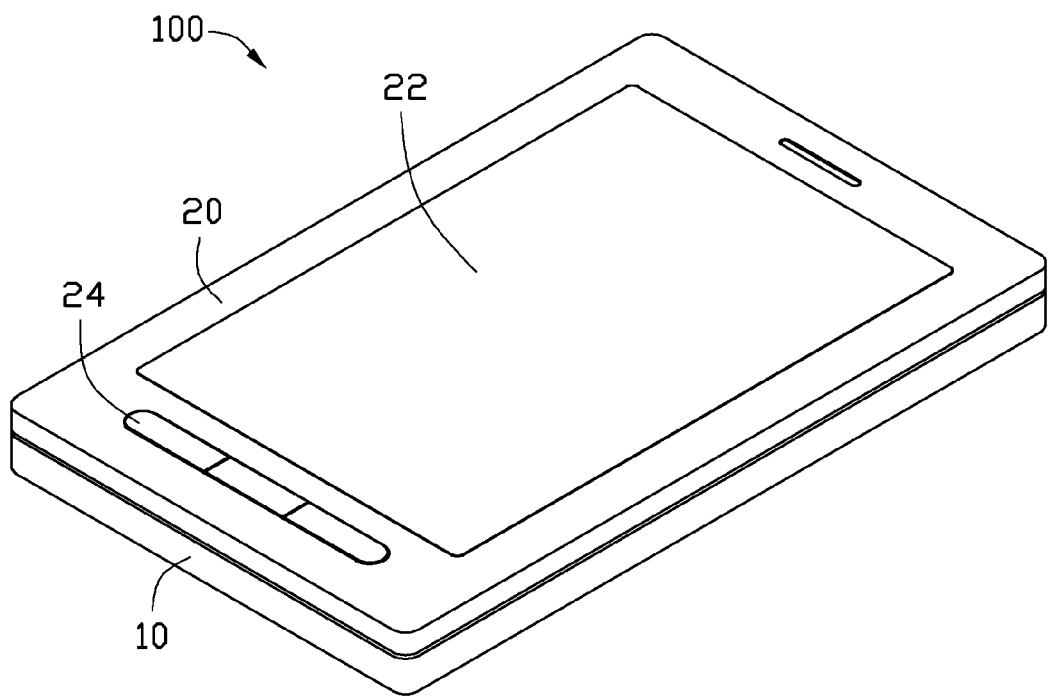
FIG. 3 is an assembled view of the electronic device shown in FIG. 1.
Figure 4:
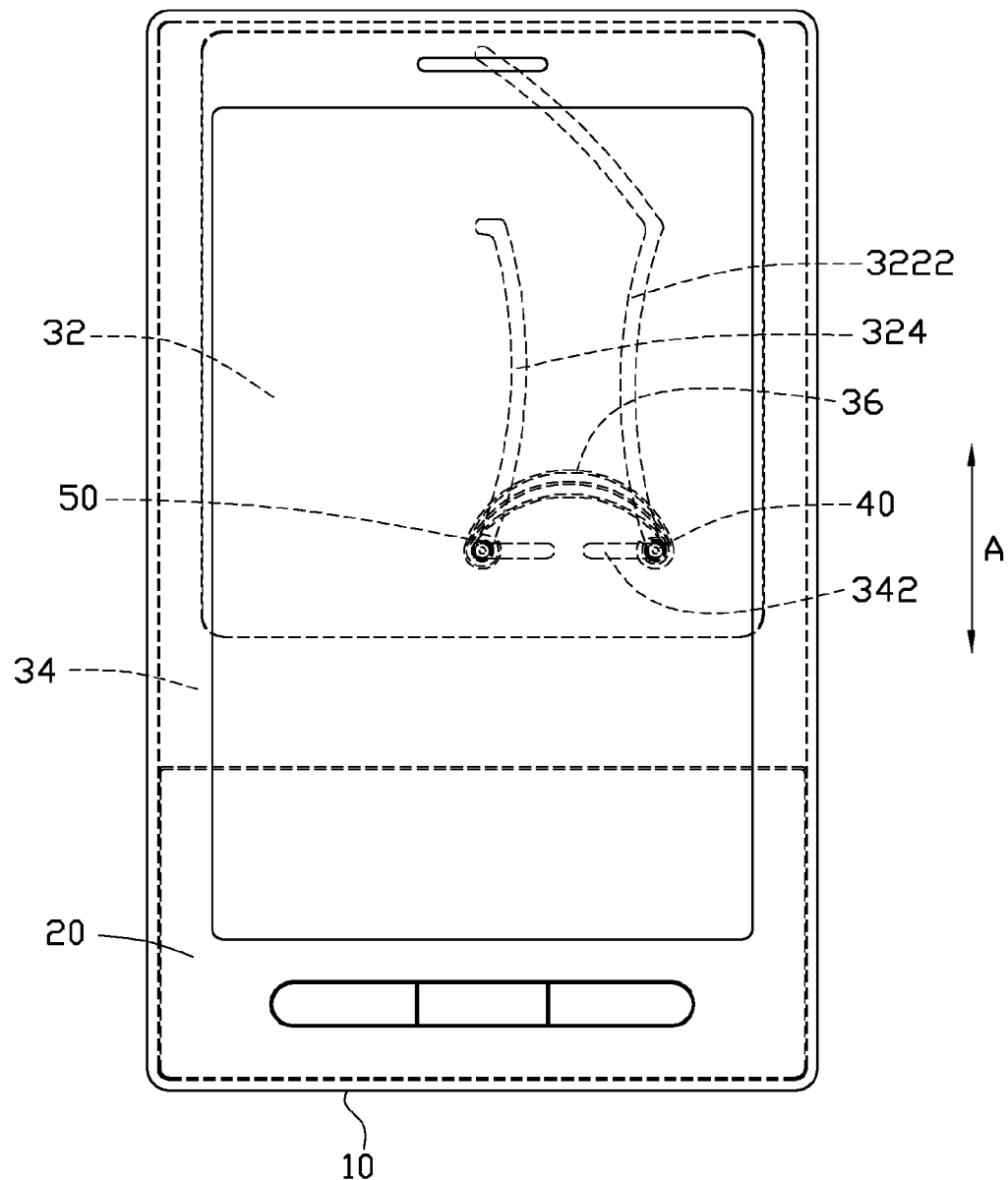
FIG. 4 is an assembled and partially perspective view of the electronic device in a first position.
Figure 5:
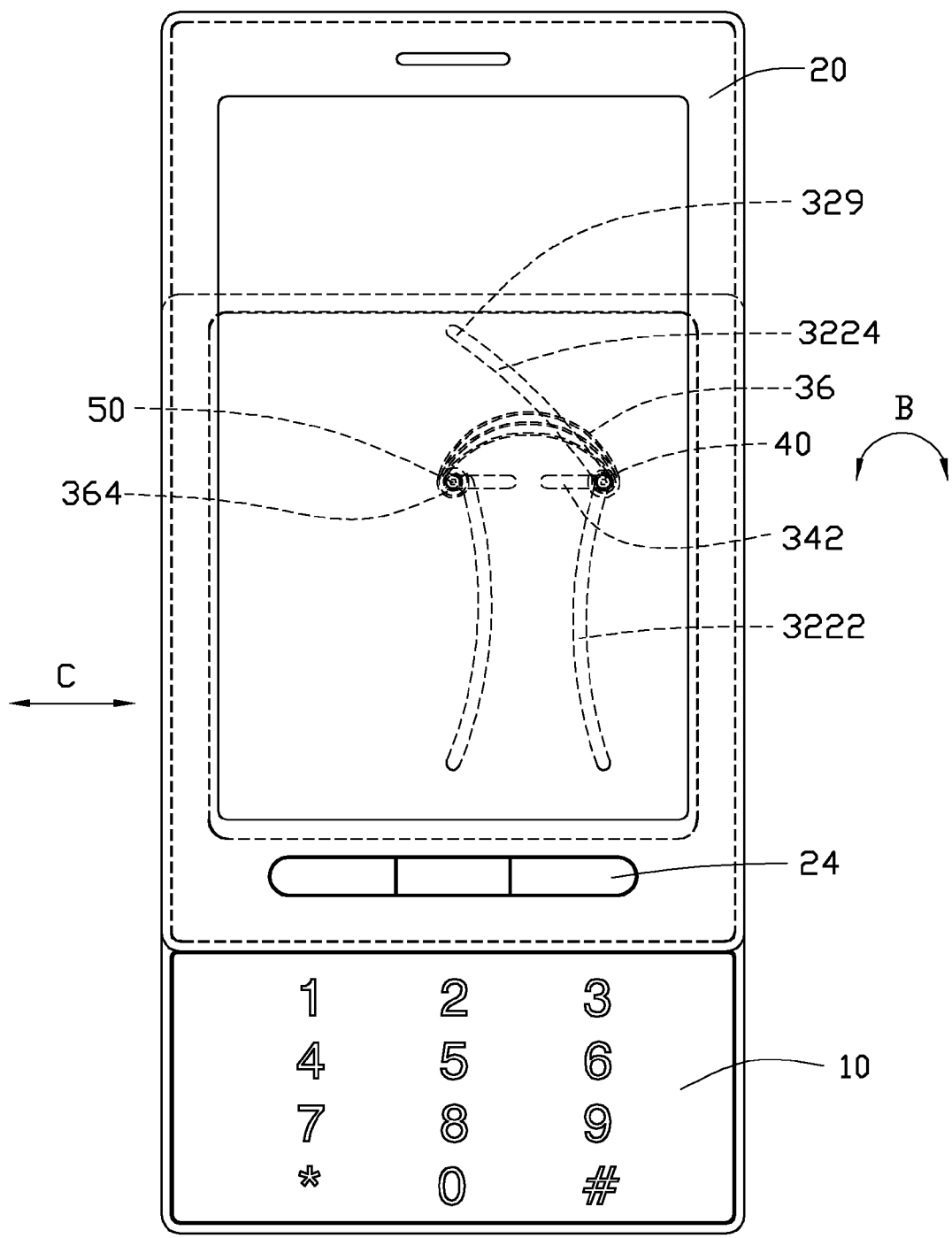
FIG. 5 is an assembled and partially perspective view of the electronic device in a second position.

Referring to FIGS. 3-5, in use, the upper housing 20 is pushed in the first direction A so the upper plate 34 slides relative to the lower plate 32 in the first direction A. At this time, the first pin 40 slides in the sliding groove section 3222 and the first track 341 toward the second pin 50. The second pin 50 slides in the second guiding groove 324 and the second track 342 toward the first pin 40. Thus, the resilient portion 362 is compressed to accumulate elastic force. When the first pin 40 slides over the intermediate portion of the sliding groove section 3222 and the second pin 50 slides over the intermediate portion of the second guiding groove 324, the elastic element assembly 36 decompresses and the first/second pin 40, 50 automatically slide in the sliding groove section 3222 and the second guiding groove 324 until the first pin 40 slides to the second sliding end 328. This allows the upper housing 20 to slide in a relative location to the lower housing 10 in the first direction A.

Figure 6:
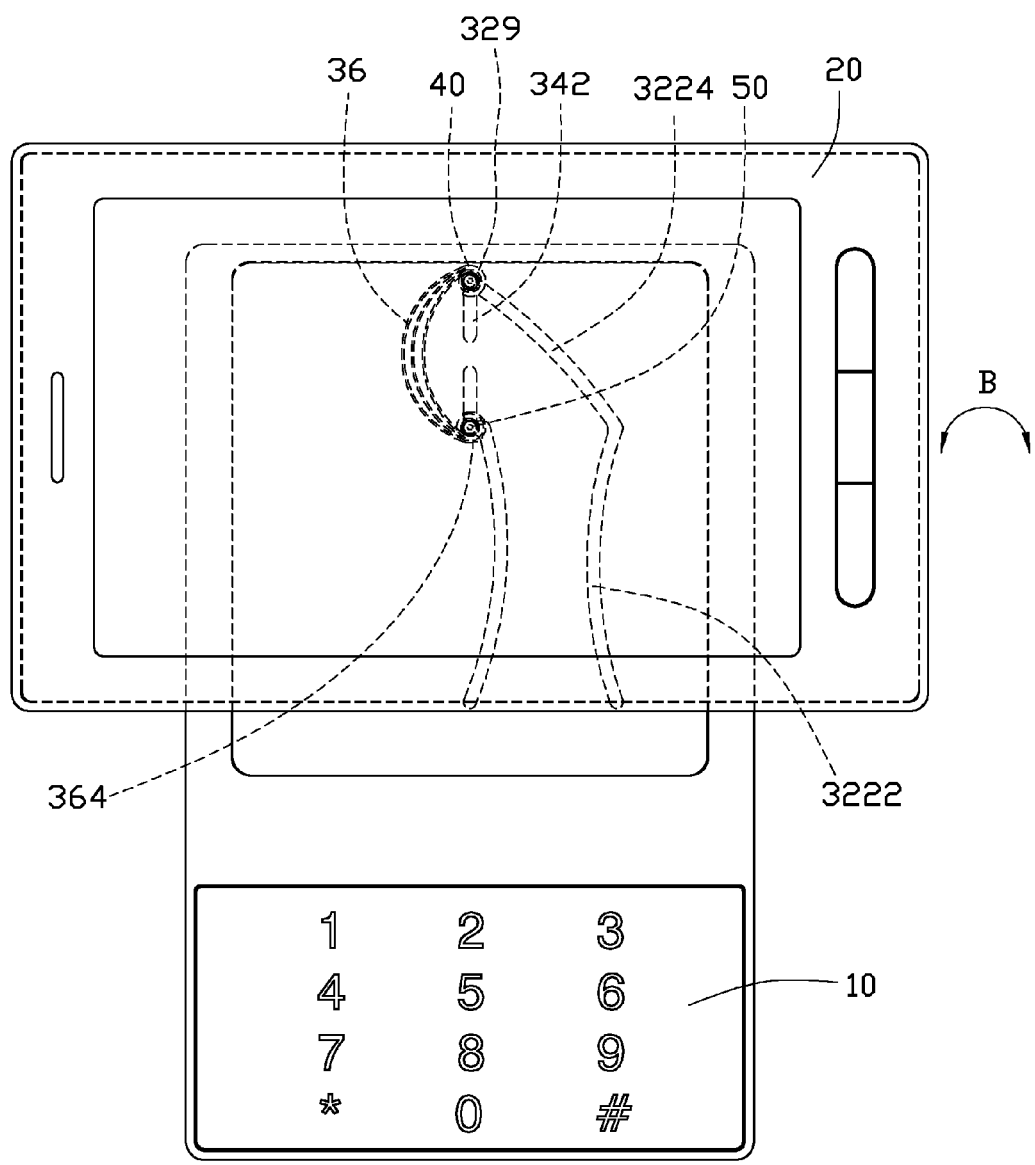
FIG. 6 is an assembled and partially perspective view of the electronic device in a third position.

Referring to FIGS. 5 and 6, to rotate the upper housing 20 relative to the lower housing 10, the upper housing 20 is pushed in the second direction C so the first pin 40 slides into the rotating groove section 3224. At this time, the upper housing 20 rotates about the second pin 50 relative to the lower housing 10 and the first pin 40 slides in the rotating groove section 3224 to the rotating end 329.

It is to be further understood that even though numerous characteristics and advantages of the exemplary embodiments have been set forth in the foregoing description, together with details of structures and functions of various embodiments, the disclosure is illustrative only, and changes may be made in detail, especially in matters of shape, size, and arrangement of parts within the principles of the exemplary invention to the full extent indicated by the broad general meaning of the terms in which the appended claims are expressed.

What is claimed is:

1. A rotating mechanism, comprising:
a lower plate defining a first guiding groove and a second guiding groove, the first guiding groove including a sliding groove section and a rotating groove section, the sliding groove section mirror-image symmetrical with the second guiding groove, the rotating groove section extending from an end of the sliding groove section toward the second guiding groove;
an upper plate defines a first track and a second track;
an elastic element assembly having two opposite retaining portions;
a first pin located at one of the retaining portions, the first pin slidably received in the first guiding groove and the first track; and
a second pin located at the other retaining portion, the second pin slidably received in the second guiding groove and the second track;
wherein when the first pin slides in the sliding groove section and the first track, and the second pin slides in the second guiding groove and the second track, the upper plate slides relative to the lower plate with the elastic element assembly decompressing after being compressed; when the second pin is located at an end of the second guiding groove and the first pin slides in the rotating groove section and the first track, the upper plate rotates relative to the lower plate with the elastic element assembly decompressing after being compressed.

2. The rotating mechanism claimed in claim 1, wherein the sliding groove section and the second guiding groove are both arcuate.

3. The rotating mechanism claimed in claim 1, wherein the elastic element assembly includes a compressible spring.

4. The rotating mechanism claimed in claim 1, wherein the second guiding groove and the sliding groove section both extend along a first direction.

5. The rotating mechanism claimed in claim 4, wherein the first track and the second track both extend in a second direction perpendicular to the first direction.

6. A rotating mechanism, comprising:
a lower plate defining a first guiding groove and a second guiding groove along a first direction, the first guiding groove including a sliding groove section and a rotating groove section, the sliding groove section mirror-image symmetrical with the second guiding groove, the rotating groove section extending from an end of the sliding groove section toward the second guiding groove;
an upper plate defining a first track and a second track along a second direction perpendicular to the first direction;
an elastic element assembly having two opposite retaining portions;
a first pin located at one of the retaining portions, the first pin slidably received in the first guiding groove and the first track; and
a second pin located at the other retaining portion, the second pin slidably received in the second guiding groove and the second track;
wherein when the upper plate slides relative to the lower plate in the first direction, the first pin slides in the sliding groove section and the first track toward the second pin, the second pin slides in the second guiding groove and the second track toward the first pin, the elastic element assembly is compressed.

7. The rotating mechanism claimed in claim 6, wherein the sliding groove section and the second guiding groove are both arcuate.

8. The rotating mechanism claimed in claim 6, wherein the elastic element assembly includes a compressible spring.

9. The rotating mechanism claimed in claim 6, wherein when the first pin slides over an intermediate portion of the sliding groove section and the second pin slides over an intermediate portion of the second guiding groove, the elastic element assembly decompresses and the first pin automatically slide in the sliding groove section and the second pin automatically slides in the second guiding groove.

10. An electronic device, comprising:
an upper housing;
an lower housing;
a rotating mechanism, the upper housing and the lower housing connected by the rotating mechanism, the rotating mechanism comprising:
a lower plate defining a first guiding groove and a second guiding groove along a first direction, the first guiding groove including a sliding groove section and a rotating groove section, the sliding groove section mirror-image symmetrical with the second guiding groove, the rotating groove section extending from an end of the sliding groove section toward the second guiding groove;
an upper plate defining a first track and a second track along a second direction perpendicular to the first direction;
an elastic element assembly having two opposite retaining portions;
a first pin located at one of the retaining portions, the first pin slidably received in the first guiding groove and the first track; and
a second pin located at the other retaining portion, the second pin slidably received in the second guiding groove and the second track;
wherein when the upper plate slides relative to the lower plate in the first direction, the first pin slides in the sliding groove section and the first track toward the second pin, the second pin slides in the second guiding groove and the second track toward the first pin, the elastic element assembly is compressed.

11. The electronic device claimed in claim 10, wherein the sliding groove section and the second guiding groove are both arcuate.

12. The electronic device claimed in claim 10, wherein the elastic element assembly includes a compressible spring.

13. The electronic device claimed in claim 10, wherein when the first pin slides over an intermediate portion of the sliding groove section and the second pin slides over an intermediate portion of the second guiding groove, the elastic element assembly decompresses and the first pin automatically slide in the sliding groove section and the second pin automatically slides in the second guiding groove.

* * * * *